United States Patent [19]

Mikesell et al.

[11] Patent Number: 5,714,862
[45] Date of Patent: Feb. 3, 1998

[54] METHOD AND APPARATUS FOR MONITORING THE ROTATING FREQUENCY OF DE-ENERGIZED INDUCTION MOTORS

[75] Inventors: Harvey E. Mikesell, McMurray; Eric Lucy, Murrysville, both of Pa.

[73] Assignee: The United States of America as represented by the Department of Energy, Washington, D.C.

[21] Appl. No.: 649,974

[22] Filed: May 2, 1996

[51] Int. Cl.[6] .................................................. G01P 3/46
[52] U.S. Cl. ....................... 318/807; 318/459; 318/500; 324/177
[58] Field of Search ............................ 318/145, 368, 318/459, 500, 503, 565, 805, 807, 810, 811; 388/909, 928.1; 324/160, 177; 73/488, 514.15

[56] References Cited

U.S. PATENT DOCUMENTS

| | | |
|---|---|---|
| 3,626,264 | 12/1971 | Halfhill et al. . |
| 4,078,194 | 3/1978 | Johnson, Jr. . |
| 4,204,425 | 5/1980 | Mallick, Jr. . |
| 4,241,299 | 12/1980 | Bertone . |
| 4,291,260 | 9/1981 | Nixon . |
| 4,893,067 | 1/1990 | Bhagwat et al. . |
| 5,440,219 | 8/1995 | Wilkerson ............................ 318/802 |
| 5,473,725 | 12/1995 | Chen et al. ........................... 318/254 |

*Primary Examiner*—Bentsu Ro
*Attorney, Agent, or Firm*—Virginia B. Caress; William R. Moser; Paul A. Gottlieb

[57] ABSTRACT

The rotational speed of a coasting induction motor is measured by sensing the residual electrical voltages at the power terminals of the motor, thus eliminating the need for conventional tachometer equipment, additional mechanical components or modifications to the induction motor itself. The power terminal voltage signal is detected and transformed into a DC voltage proportional to the frequency of the signal. This DC voltage can be input to the control system of a variable frequency motor controller to regulate the output characteristics thereof relative to the speed of the coasting motor.

6 Claims, 3 Drawing Sheets

1

METHOD AND APPARATUS FOR MONITORING THE ROTATING FREQUENCY OF DE-ENERGIZED INDUCTION MOTORS

ORIGIN OF THE INVENTION

The invention was made under a contract with the U.S. Navy.

BACKGROUND OF THE INVENTION

1. Field of the Invention

The present invention relates to induction motors and more particularly, to monitoring the rotational speed of such motors during coastdown after deenergization.

2. The Prior Art

There are a number of applications involving induction motors where it is desirable to obtain a real time measurement of the rotational speed of the motor while the motor is deenergized and coasting. For example, a motor speed indication is desirable when synchronizing the output frequency of a variable frequency motor controller (VFMC) with the speed of the motor so as to reduce surge currents at the moment at which the VFMC is connected to the rotating motor. This application can be used when quickly transferring from a fixed frequency supply to the variable frequency supply, when rapidly reenergizing a motor after a momentary interruption of power to VFMC, or in connection with a standby variable frequency motor supply for applications requiring continuous induction motor service with speed regulation. With respect to the former, it will be appreciated that proper synchronization must be maintained during this transfer to avoid potential equipment damage.

Another example where such a rotational speed measurement is desirable or necessary is in the measurement of fluid flow such as a liquid passing by convection through an in-line pump which must be turned on when convection flow becomes too low, or gas passing by convection through a fan which must be turned on when the gas flow becomes too low.

A further example of a situation in which such a motor speed measurement is desirable is in connection with flow coastdown measurement of a motor-driven pump in order to characterize loss of flow transients.

One possible approach to obtaining such rotational speed measurements for motors that do not already include an installed tachometer is to backfit the motor with such a tachometer. However, this approach is not always practical or possible due to problems of inaccessibility (because of the hardware design and/or the harsh environment of the motor) and excessive costs associated with the modification.

SUMMARY OF THE INVENTION

In accordance with the invention, a method and apparatus (i.e., circuitry) are provided for measuring induction motor speed during coastdown in a highly practical manner without the need for mechanical connections or changes to the motor itself. The simplicity of the circuitry employed and the ease of installation thereof enables backfitting to existing induction drive motor systems as well as use of the invention in portable test equipment. Moreover, the fast response of the circuitry in providing a motor speed indication permits use thereof in high speed applications such as the fast transfer of a rapidly decelerating motor for a variable frequency motor supply or controller.

According to a first aspect of the invention, there is provided in an induction motor system including an induction motor having power input terminals and providing a residual voltage signal at the power input terminals after deenergization of the motor, a circuit for monitoring the rotational speed of the induction motor after deenergization thereof, the circuit comprising sensor means for sensing the residual voltage signal at the power input terminals and for producing an output in accordance therewith, and converter means for converting the output of the sensor means into a voltage level proportional to the frequency of the residual voltage signal and thus to the speed of the induction motor.

In one application, the inductor motor system includes a variable frequency motor controller for controlling the induction motor and the voltage level produced by the converter means is connected to an input of the variable frequency motor controller to regulate an output characteristic thereof relative to the speed of the induction motor after deenergization.

Preferably, the sensor means includes pulse forming amplifier means, having an output and comprising at least one inverting operational amplifier, for magnifying the residual voltage, and an opto-electrical transducer connected to the output of the pulse forming amplifier means. The converter means advantageously comprises a frequency-to-voltage converter connected to the opto-electrical transducer.

According to a further aspect of the invention, a method is provided for monitoring the rotating frequency of an induction motor during coasting subsequent to deenergization thereof, the motor producing a residual voltage signal at power input terminals during this coasting, and the method comprising: monitoring the residual voltage signal at the power input terminals, and converting the monitored residual voltage signal into an output voltage proportional to the rotating frequency of said induction motor.

In an application corresponding to that described above, the induction motor is controlled by a variable frequency controller, and the method further comprising using said output voltage to control the variable frequency controller.

Other features and advantages of the invention will be set forth in, or apparent from, the following detailed description of preferred embodiments of the invention.

DESCRIPTION OF THE PREFERRED EMBODIMENTS

Figure 1A:
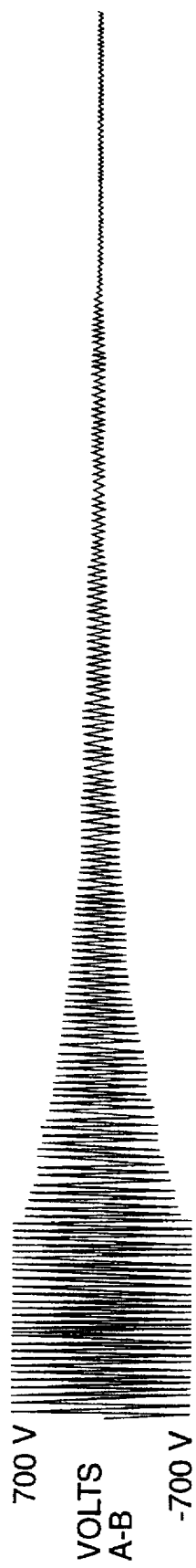
FIGS. 1a to 1c are plots of voltage versus time for the stator terminal voltages of a typical induction motor.
Figure 1B:
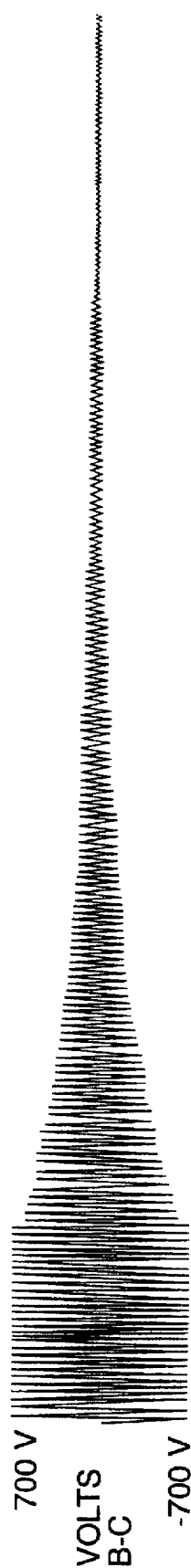
Figure 1C:
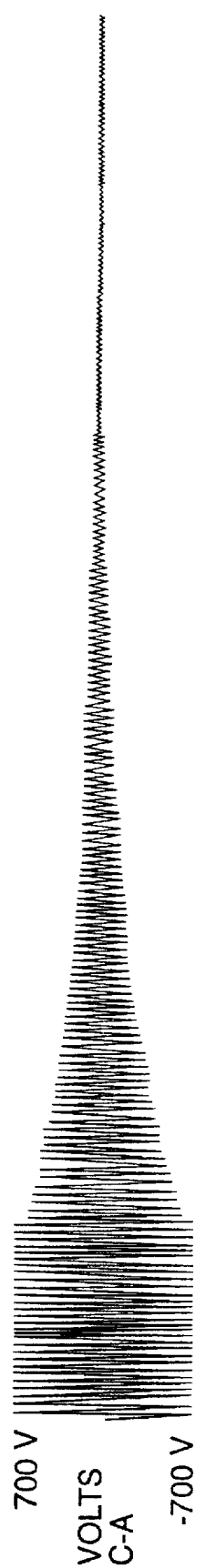

Referring to FIG. 1a to 1c, there is shown the residual stator terminal voltage on a 75 horsepower motor-generator following deenergization thereof. As shown, this terminal voltage does not decay to zero but stabilizes at a detectable cyclic ratio. Such a motor-generator, in common with other induction motors, generates the small voltage illustrated as the result of rotating fields sustained by the residual magnetism of the motor. The frequency of this residual voltage is directly proportional to motor speed during the coastdown period following deenergization and characteristically the magnitude of the voltage remains above 1 volt on the motor generator. Most induction motors will have residual magnetism following deenergization and therefore, some substantial detectable voltage will be present at the power terminals of these motors. As discussed above, the detectability of this low voltage signal is important for any application that involves motor speed monitoring for a significant period of time after deenergization. In most induction motors, this residual voltage remains above 1 volt RMS until the motor stops.

As was discussed above, the present invention is concerned with determining the speed of a deenergized induction motor from the residual voltage which is present at the power input terminals (stator windings) and which is of the general character just described in connection with FIG. 1.

Figure 2:
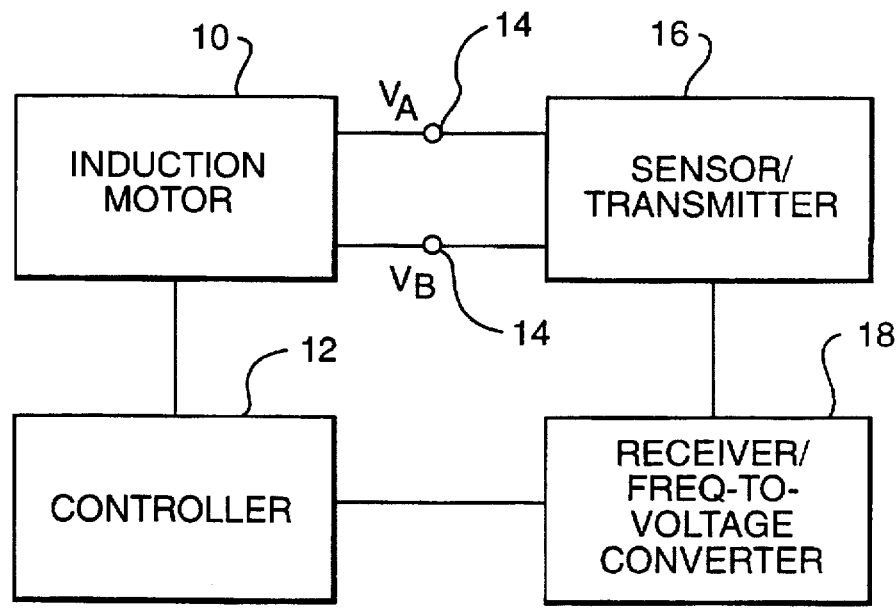
FIG. 2 is a block diagram of a motor-controller system incorporating a rotational speed sensing circuit in accordance with one embodiment of the invention.

Referring to FIG. 2, a block diagram of the overall system includes an induction motor 10 and associated variable frequency motor controller 12. Two power input terminals (stator windings) 14 are connected to a sensor/transmitter circuit 16. The output of sensor/transmitter 16 is connected to a receiver/frequency-to-voltage converter circuit 18 having an output which, in turn, is connected to the control system of the variable frequency motor controller 12. In general, the purpose of circuits 16 and 18 is to detect and transform the motor terminal voltage signal at terminals 14 into a DC voltage proportional to the frequency of the signal. This DC voltage, which appears at the output of circuit 18, is input to the control system of controller 12 to regulate the output characteristics thereof relative to the speed of the coasting motor.

Figure 3:
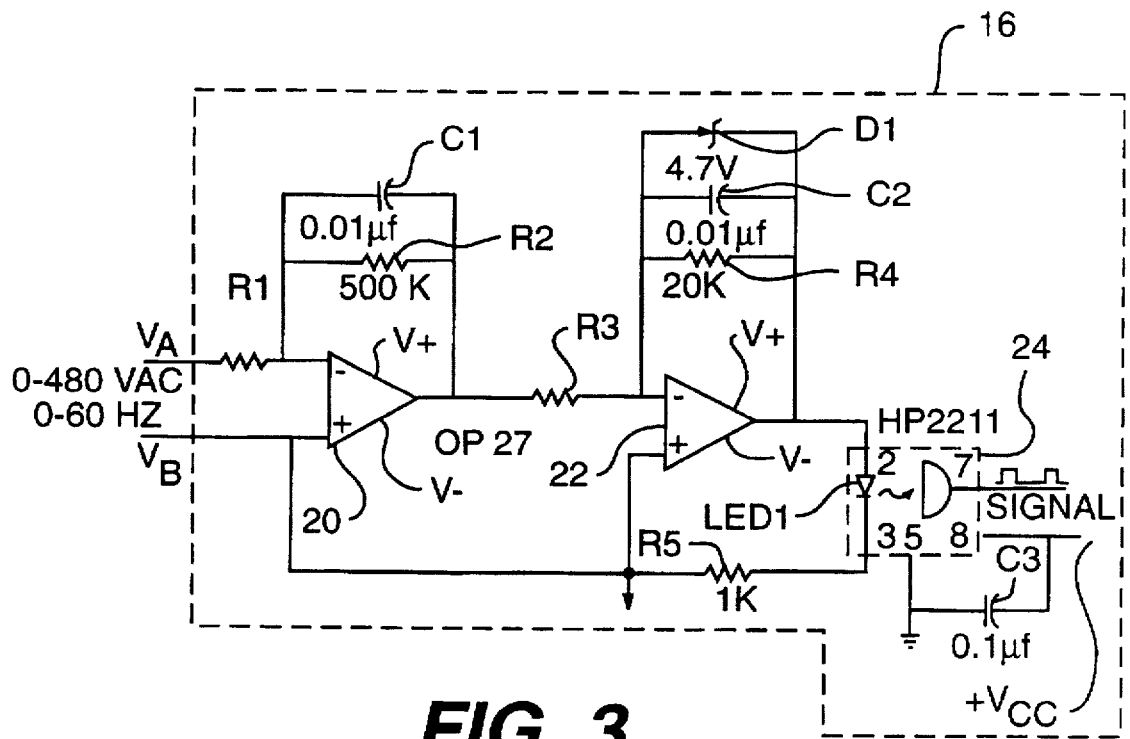
FIG. 3 is a circuit diagram of a preferred implementation of the sensor/transmitter circuit of FIG. 2.

Referring to FIG. 3, there is shown a circuit diagram of a preferred embodiment of the sensor/transmitter circuit 16 of FIG. 2. The circuit includes an input resistor R1 and a pair of inverting operational amplifiers 20 and 22 which function as pulse forming amplifiers. A coupling resistor R3 interconnects operational amplifiers 20 and 22 while resistor R2 and capacitor C1, and resistor R4, capacitor C2 and zener diode D1 amplify and clip the terminal voltage signal while reducing high frequency noise and possible oscillations. The output of operational amplifier 22 is connected to an optocoupler 24 which provides isolation as well as shaping of the signal to produce an output signal of generally square wave shape as illustrated. The output of operational amplifier 22 is connected in a series path including an light emitting diode LED1 of optocoupler 24 and a resistor R5.

Figure 4:
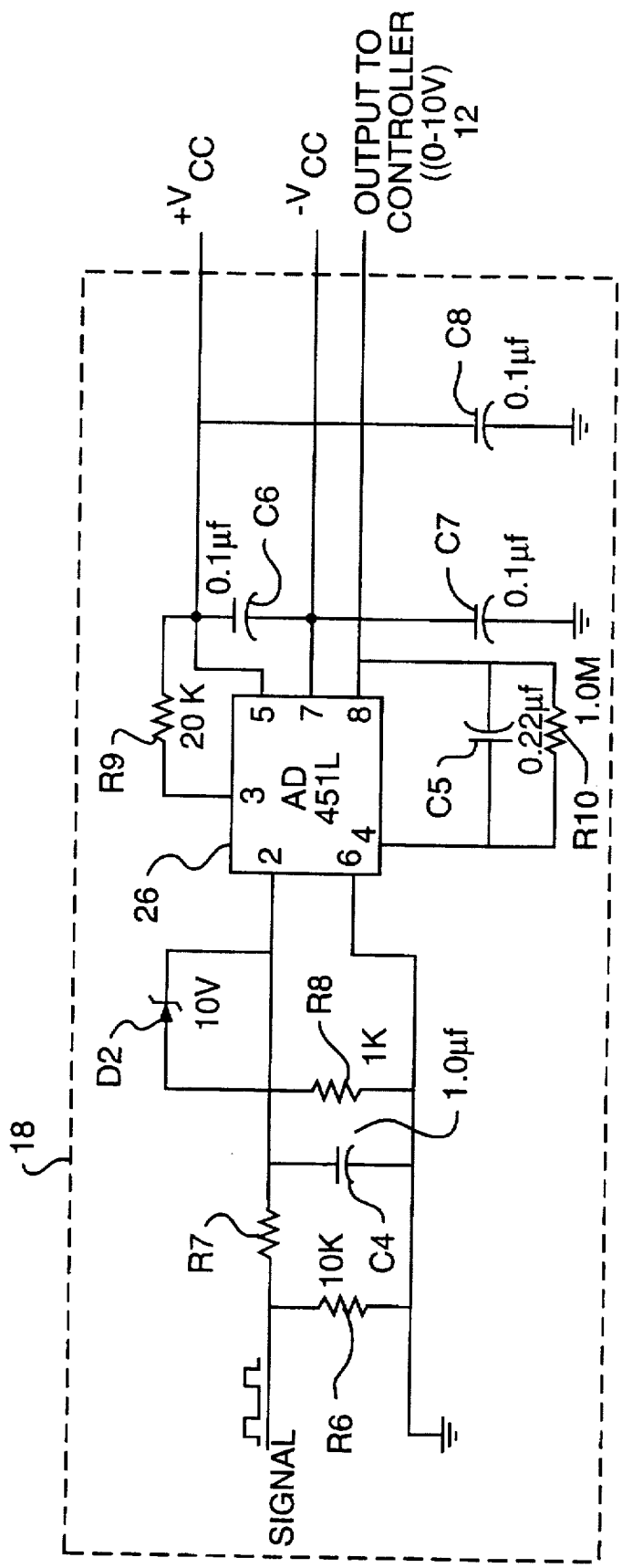
FIG. 4 is a circuit diagram of a preferred implementation of the receiver/frequency-to-voltage converter circuit of FIG. 2.

Referring to FIG. 4, there is shown a circuit diagram of the receiver/frequency-to-voltage converter circuit 18 of FIG. 2. Circuit 18 receives the output signal from circuit 16 and converts this signal into a DC voltage level proportional to the frequency of the input signal. Circuit 18 basically comprises a frequency-to-voltage converter 26 and associated chip support circuitry, comprising resistors R6, R7, R8, R9 and R10, capacitors C4, C5, C6, C7 and C8, and zener diode D2, connected as shown, for, inter alia, controlling the output voltage level. The output of converter circuit 18 is connected to controller 12, as indicated.

In accordance with a specific, exemplary embodiment, the following performance characteristics are applicable to the speed sensing circuit formed by circuits 16 and 18: 0 to 100 hertz ($H_z$) operation; frequency readings with 0.2 to greater than 480 RMS VAC input signals; provide greater than 2000 VAC isolation; and a response time of less than 0.1 sec. measured. It will, of course, be appreciated that variations may be effected in these performance characteristics and in the circuitry shown in FIGS. 3 and 4, and that faster response times and greater sensitivities can be obtained if required by the particular application to which the circuitry is to be put.

The speed sensing circuitry of FIGS. 3 and 4 has been used to measure the coastdown speed of a 75 horsepower motor-generator for the purpose of developing a fast transfer method. This application required a very fast responding motor speed indication because the transfer was to be accomplished in less than 1 second with the motor coasting down at approximately 25 hertz per second (equivalent drive input frequency). The speed sensing circuitry monitored the motor speed path during high stator voltage (475 VAC) conditions and low stator voltage (approximately 2 VAC) conditions and gave reliable motor speed indications at coastdown rates exceeding 30 hertz per second.

It will be appreciated from the foregoing that a major advantage of the invention is that only an electrical connection to the power terminals of the motor is required and, in some cases, this connection can be made outside of any harsh environment.

The speed sensing circuitry is small in size and can be located in the enclosure for the variable frequency supply. Application of the invention is, therefore, not restricted by motor design or accessibility and implementation thereof is simple and cost effective as compared with conventional tachometer designs.

Although the present invention has been described to specific exemplary embodiments thereof, it will be understood by those skilled in the art that variations and modifications can be effected in these exemplary embodiments without departing from the scope and spirit of the invention.

What is claimed is:

1. In an induction motor system including an induction motor having power input terminals and producing a residual voltage signal at said power input terminals after deenergization of the motor, a circuit for monitoring the rotational speed of the induction motor after deenergization thereof, said circuit comprising: (a) sensor means for sensing the residual voltage signal at said power input terminals and for producing an output in accordance therewith, b converter means in electrical connection with said output of said sensor means, for converting said output of said sensor means into a voltage level proportional to the frequency of the residual voltage signal and thus to the speed of the induction motor, and c a variable frequency motor controller in electrical connection with said voltage level of said converter means, adapted to control said induction motor by regulating an output characteristic of said controller relative to the speed of the induction motor after deenergization.

2. A system as claimed in claim 1 wherein said sensor means includes pulse forming amplifier means, having an output and comprising at least one inverting operational amplifier, for amplifying and filtering the residual voltage to produce a pulse waveform, and an opto-electrical transducer connected to the output of said pulse forming amplifier means.

3. A system as claimed in claim 2 wherein said converter means comprises a frequency-to-voltage converter connected to said opto-electrical transducer.

4. A method for monitoring the rotating frequency of an induction motor during coasting subsequent to deenergization thereof, said motor producing a residual voltage signal at power input terminals during said coasting, and said method comprising:

monitoring said residual voltage signal at said power input terminals, converting said residual voltage signal into an output voltage proportional to the rotating frequency of said induction motors, and controlling said induction motor by regulating a variable frequency motor controller's output relative to the speed of said induction motor after deenergization.

5. A method as claimed in claim 4 wherein said induction motor is controlled by a variable frequency motor controller, said method further comprising using said output voltage to control operation of said variable frequency motor controller.

6. In an induction motor system including an induction motor having power input terminals and producing a residual voltage signal at said power input terminals after deenergization of the motor, a circuit for monitoring the rotational speed of the induction motor after deenergization thereof, said circuit comprising (a) sensor means for sensing the residual voltage signal at said power input terminals and for producing an output in accordance therewith, and (b) converter means comprising a frequency-to-voltage converter adapted to convert said output of said sensor means into a DC voltage level proportional to the frequency of the residual voltage signal and thus to the speed of the induction motor.

* * * * *

UNITED STATES PATENT AND TRADEMARK OFFICE
CERTIFICATE OF CORRECTION

PATENT NO. : 5,714,862
DATED : February 3, 1998
INVENTOR(S) : Harvey E. Mikesell, et al.

It is certified that error appears in the above-identified patent and that said Letters Patent is hereby corrected as shown below:

In claim 1 in column 4, line 38, change "b converter" to -- (b) converter -- .

In claim 1 in column 4, line 44, change "c a variable" to -- (c) a variable -- .

Signed and Sealed this

Seventh Day of April, 1998

BRUCE LEHMAN

*Attest:*

*Attesting Officer*    *Commissioner of Patents and Trademarks*